(12) United States Patent
Bowman et al.

(10) Patent No.: US 8,244,459 B2
(45) Date of Patent: *Aug. 14, 2012

(54) METHOD FOR STITCHING MULTIPLE CONVERGING PATHS

(75) Inventors: Gordon Gregory Bowman, Kanata (CA); Eric Johnson, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/187,602

(22) Filed: Jul. 21, 2011

(65) Prior Publication Data

US 2011/0275390 A1 Nov. 10, 2011

Related U.S. Application Data

(63) Continuation of application No. 11/627,558, filed on Jan. 26, 2007, now Pat. No. 7,987,045.

(51) Int. Cl.
*G01C 21/26* (2006.01)
(52) U.S. Cl. .......... 701/400; 701/409; 701/437

(58) Field of Classification Search .......... 701/200, 701/201, 202, 208, 211, 400, 408, 409, 410, 701/416, 418, 420, 425, 426, 428, 431, 437; 703/2; 345/619, 629, 648, 649, 659; 340/995.14, 340/995.1
See application file for complete search history.

(56) References Cited

U.S. PATENT DOCUMENTS

| | | | |
|---|---|---|---|
| 5,559,938 A * | 9/1996 | Van Roekel et al. | 345/441 |
| 6,119,066 A * | 9/2000 | Sugiura et al. | 701/428 |
| 6,188,956 B1 * | 2/2001 | Walters | 701/200 |
| 6,565,610 B1 * | 5/2003 | Wang et al. | 715/210 |
| 2004/0024575 A1 * | 2/2004 | Surazhsky et al. | 703/2 |
| 2005/0107993 A1 * | 5/2005 | Cuthbert et al. | 703/2 |
| 2005/0270299 A1 * | 12/2005 | Rasmussen et al. | 345/552 |
| 2006/0058949 A1 * | 3/2006 | Fogel et al. | 701/208 |

* cited by examiner

*Primary Examiner* — Khoi Tran
*Assistant Examiner* — Stephen Holwerda
(74) *Attorney, Agent, or Firm* — Gowling Lafleur Henderson LLP

(57) ABSTRACT

A method of stitching converging path segments to aesthetically label Y-intersections, path bifurcations or splits in roads or the like entails determining which pair of adjacent path segments subtend the largest angle. The path segments subtending the largest angle are reconstructed (stitched together) and a single instance of the label is then rendered along the reconstructed path. Although this stitching can be performed on the client device, pre-stitching server-side is even more efficient in terms of economizing over-the-air bandwidth and onboard processing resources.

18 Claims, 12 Drawing Sheets

METHOD FOR STITCHING MULTIPLE CONVERGING PATHS

CROSS-REFERENCE TO RELATED APPLICATIONS

This application is a continuation of U.S. patent application Ser. No. 11/627,558 filed Jan. 26, 2007 which claims priority from U.S. Provisional Patent Application No. 60/788,434 entitled "Methods and Apparatus for Dynamically Labelling Map Objects in Visually Displayed Maps of Mobile Communication Devices" filed on Mar. 31, 2006 and from U.S. Provisional Patent Application No. 60/787,541 entitled "Method and System for Distribution of Map Content to Mobile Communication Devices" filed on Mar. 31, 2006.

TECHNICAL FIELD

The present disclosure relates generally to wireless communications devices and, in particular, to techniques for generating map content on wireless communications devices.

BACKGROUND

Wireless communications devices such as the BlackBerry® by Research in Motion Limited enable users to download map content from web-based data sources such as BlackBerry Maps™, Google Maps™ or Mapquest™. Downloaded map content is displayed on a small LCD display screen of the wireless communications device for viewing by the user. The user can pan up and down and side to side as well as zoom in or out. Due to the small display on the device and due to the limited over-the-air (OTA) bandwidth, there is a need to optimize the delivery and handling of the map data.

With the increasing availability of wireless communications devices having onboard Global Positioning System (GPS) receivers for providing location-based services (LBS), the efficient delivery and handling of map data is increasingly important.

In some systems, map data, including label data for labelling map features, is communicated from map servers to wireless communications devices in discrete portions which are assembled client-side to provide the map content requested by the user. Typically, portions forming a path or other feature are stitched together prior to rendering so as to facilitate labelling. However, when reconstructing, for example, a path from discrete portions of data, however, redundant labelling can occur if labels associated with each portion of data are rendered for the same feature. Thus, the issue of label redundancy should be addressed either client-side and/or server-side. However, due to the limited over-the-air bandwidth and the limited onboard processing resources of most wireless devices, it is preferable to run computationally intensive algorithms server side in order to reduce the data traffic to the device as well as the onboard processing requirements.

In terms of labelling, a specific problem arises when labelling a Y-intersection where a single path splits into two branches, such as when a two-lane highway bifurcates into a divided four-lane highway. Each of the three path segments forming the Y-intersection could have its own label associated therewith. A current stitching technique compiles a list of all path segments with respective labels, searches the list of segments for identical labels and common endpoints, and then "blindly" stitches the first two segments it finds that have the same label and a common endpoint without determining whether the list contains any other segments having the same label and a common endpoint. If the two of the three paths are stitched based on this technique, the label may end up wrapping around onto itself if the application stitches together the two branches of the Y-intersection. When the label folds back onto itself, as illustrated in FIG. 6, the result is clearly unsatisfactory in terms of readability.

Accordingly, a technique to efficiently and aesthetically label Y-intersections (or any other map features where at least three path segments converge) remains highly desirable.

BRIEF DESCRIPTION OF THE DRAWINGS

Further features and advantages of the present technology will become apparent from the following detailed description, taken in combination with the appended drawings, in which.

DETAILED DESCRIPTION

Figure 1:
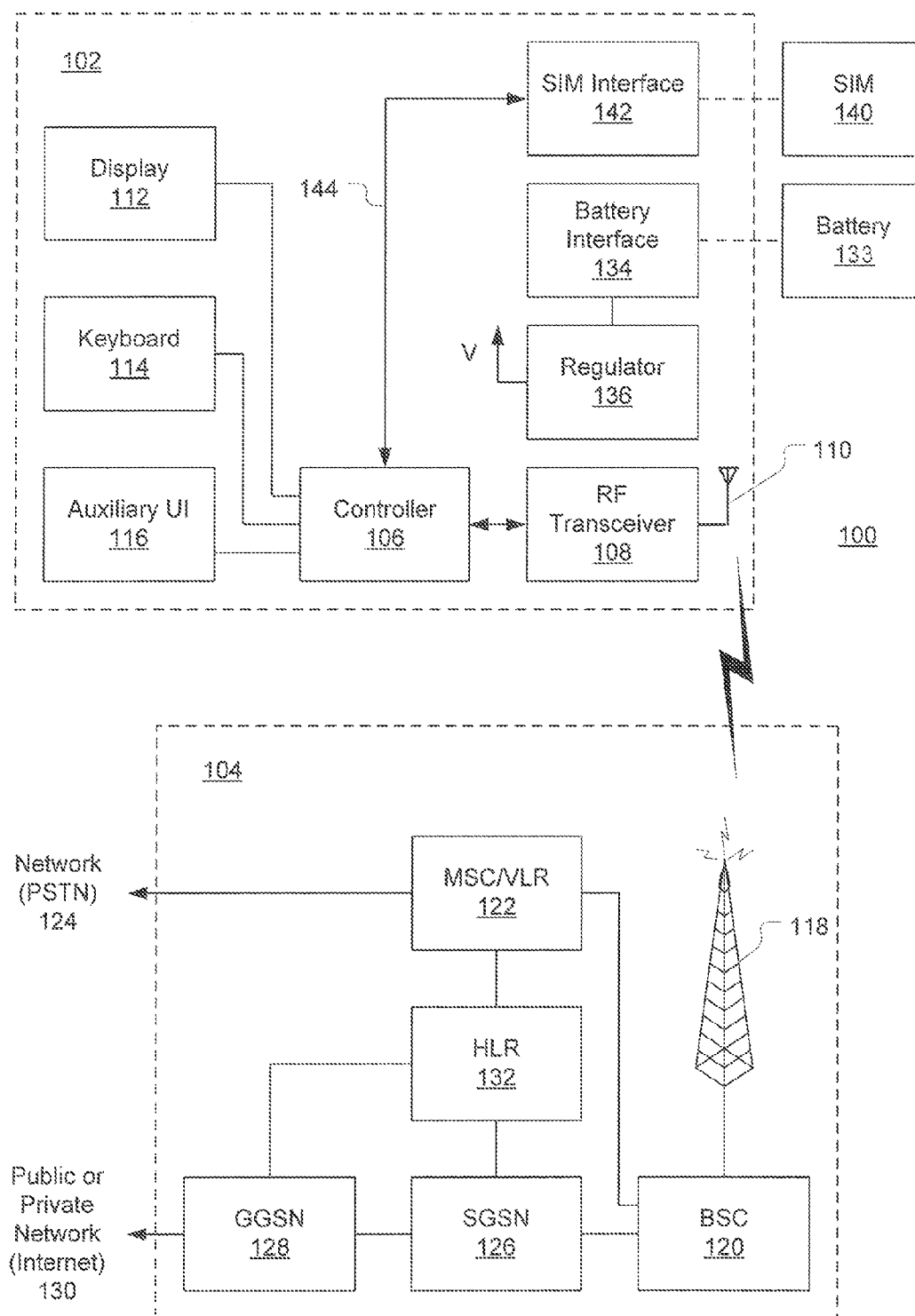
FIG. 1 is a block diagram schematically illustrating pertinent components of a wireless communications device and of a wireless communications network for implementing the present technology.

The present technology provides, in general, a method of stitching multiple converging paths of a map to be displayed on a wireless communications device. Map data, including label data, is downloaded over-the-air in small, discrete portions or sets of data, each with its own label data for labelling features of the map. Because the data is downloaded in discrete portions, segments of a common path may require stitching together either server-side and/or client-side in order to avoid redundant labelling.

This technology addresses the specific labelling problem that arises at intersections where at least three path segments from discretely downloaded data sets come together. To aesthetically label, for example, a Y-intersection, the server and/or wireless device must first identify Y-intersections or splits/bifurcations where one path divides into two (or conversely where two paths merge into one). For example, a Y-intersection can be found where a two-lane highway splits into a four-lane divided highway (or conversely when the four-lane divided highway merges into a two-lane highway). As another example, a Y-intersection can be found where a boulevard splits around a median (or, conversely, merges where the median ends).

After the three path segments constituting the Y-intersection are identified, the angle subtending each pair of adjacent path segments is determined. The pair of path segments subtending the largest angle is then stitched together to form a reconstructed path. The server and/or wireless device then renders a single (preferably centrally-positioned) instance of the label along the reconstructed path. Stitching as many segments as possible reduces label redundancy, thereby minimizing the amount of label data traffic that needs to be transmitted to the client device. Stitching as many segments as possible also provides long paths to facilitate placement of labels and avoidance of collisions with other labels.

The third ("unstitched") path segment is not stitched to the other two, i.e. it is not stitched to the reconstructed path. A label is preferably not rendered along the third, "unstitched" path segment, although in particular cases it may be advantageous to do so, in order to improve overall readability of the map, e.g. in a case where it is not readily apparent given the label positions that the third, "unstitched" path segment is part of the same path.

Thus, an aspect of the present technology is a method of stitching multiple converging paths of a map to be displayed on a wireless communications device. The method includes steps of providing map data for rendering the map on a display of the device, the map data including label data for labelling paths on the map. Once the data is provided, the next step entails identifying at least three path segments that converge to a common point on the map, each of the path segments having an identical label. After the three or more path segments are identified, the next step involves determining an angle subtended by each pair of adjacent path segments in order to identify which pair of adjacent path segments subtends the largest angle. Once the pair of adjacent path segments subtending the largest angle is determined, the next steps entail generating a reconstructed path by stitching together the pair of adjacent path segments subtending the largest angle and rendering a single instance of the label along the reconstructed path. This method of stitching multiple converging paths of a map is preferably performed server-side, where "pre-stitching" computations can be handled most easily and to furthermore avoid having to transmit redundant labels to the device. This method, however, can also be performed client-side, i.e. on the client device.

Another aspect of the present technology is a computer program product that includes a computer-readable medium having code executable by a processor to perform the steps of the foregoing method when the computer program product is loaded into memory and executed on the processor. The computer program product can be loaded into a memory of a server for performing server-side "pre-stitching" and/or into a memory of a wireless communications device for performing client-side stitching.

Yet another aspect of the present technology is a wireless communications device for enabling a user of the device to display a map on the device. The wireless device has an input device for enabling the user to cause the device to obtain map data for rendering the map to be displayed on a display of the device, the map data including label data for labelling paths on the map. The wireless device also has a memory for storing code to instruct a processor to identify at least three path segments that converge to a common point on the map, each of the path segments having an identical label, determine an angle subtended by each pair of adjacent path segments in order to identify which pair of adjacent path segments subtends the largest angle, generate a reconstructed path by stitching together the pair of adjacent path segments subtending the largest angle, and render a single instance of the label along the reconstructed path.

The details and particulars of these aspects of the technology will now be described below, by way of example, with reference to the attached drawings.

FIG. 1 is a block diagram of a communication system 100 which includes a wireless communications device 102 (also referred to as a mobile communications device) which communications through a wireless communication network 104. For the purposes of the present specification, the expression "wireless communications device" encompasses not only a wireless handheld, cell phone or wireless-enabled laptop but also any mobile communications device or portable communications device such as a satellite phone, wireless-enabled PDA or wireless-enabled MP3 player. In other words, for the purposes of this specification, "wireless" shall be understood as encompassing not only standard cellular or microwave RF technologies, but also any other communications technique that conveys data over the air using an electromagnetic signal.

The wireless communications device 102 preferably includes a visual display 112, e.g. an LCD screen, a keyboard 114 (or keypad), and optionally one or more auxiliary user interfaces (UI) 116, each of which is coupled to a controller 106. The controller 106 is also coupled to radio frequency (RF) transceiver circuitry 108 and an antenna 110. Typically, controller 106 is embodied as a central processing unit (CPU) which runs operating system software in a memory device (described later with reference to FIG. 2). Controller 106 normally controls the overall operation of the wireless communications device 102, whereas signal processing operations associated with communications functions are typically performed in the RF transceiver circuitry 108. Controller 106 interfaces with the display screen 112 to display received information, stored information, user inputs, and the like. Keyboard/keypad 114, which may be a telephone-type keypad or a full QWERTY keyboard, is normally provided for entering commands and data.

The wireless communications device 102 sends communication signals to and receives communication signals from network 104 over a wireless link via antenna 110. RF transceiver circuitry 108 performs functions similar to those of station 118 and Base Station Controller (BSC) 120, including, for example, modulation and demodulation, encoding and decoding, and encryption and decryption. It will be apparent to those skilled in the art that the RF transceiver circuitry 108 will be adapted to the particular wireless network or networks in which the wireless communications device is intended to operate.

The wireless communications device 102 includes a battery interface 134 for receiving one or more rechargeable batteries 133. Battery 133 provides electrical power to electrical circuitry in the device 102, and battery interface 134 provides for a mechanical and electrical connection for battery 133. Battery interface 134 is coupled to a regulator 136 which regulates power to the device. When the wireless device 102 is fully operationally, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Wireless communications device 102 operates using a Subscriber Identity Module (SIM) 140 which is connected to or inserted in the wireless communications device 102 at a SIM interface 142. SIM 140 is one type of a conventional "smart card" used to identify an end user (or subscriber) of wireless device 102 and to personalize the device, among other things. By inserting the SIM card 140 into the wireless communications device 102, an end user can have access to any and all of his subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical wireless device. SIM 140 may store additional user information for the wireless device as well, including datebook (calendar) information and recent call information.

The wireless communications device 102 may consist of a single unit, such as a data communication device, a cellular telephone, a Global Positioning System (GPS) unit, a multiple-function communication device with data and voice communication capabilities, a wireless-enabled personal digital assistant (PDA), or a wireless-enabled laptop computer. Alternatively, the wireless communications device 102 may be a multiple-module unit comprising a plurality of separate components, including but in no way limited to a computer or other device connected to a wireless modem. In particular, for example, in the block diagram of FIG. 1, RF circuitry 108 and antenna 110 may be implemented as a radio modem unit that may be inserted into a port on a laptop computer. In this case, the laptop computer would include display 112, keyboard 114, one or more auxiliary UI's 116, and controller 106 embodied as the computer's CPU.

The wireless communications device 102 communicates in and through a wireless communication network 104. The wireless communication network may be a cellular telecommunications network. In the example presented in FIG. 1, wireless network 104 is configured in accordance with Global Systems for Mobile communications (GSM) and General Packet Radio Service (GPRS) technologies. Although wireless communication network 104 is described herein as a GSM/GPRS-type network, any suitable network technologies may be utilized such as Code Division Multiple Access (CDMA), Wideband CDMA (WCDMA), whether 2G, 3G, or Universal Mobile Telecommunication System (UMTS) based technologies. In this example, the GSM/GPRS wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is, in turn, coupled to a public or private data network 130 (such as the Internet). HLR 132 is coupled to MSC 122, SGSN 126 and GGSN 128.

Tower station 118 is a fixed transceiver station. Tower station 118 and BSC 120 may be referred to as transceiver equipment. The transceiver equipment provides wireless network coverage for a particular coverage area commonly referred to as a "cell". The transceiver equipment transmits communication signals to and receives communication signals from wireless communications devices 102 within its cell via station 118. The transceiver equipment normally performs such functions as modulation and possibly encoding and/or encryption of signals to be transmitted to the wireless communications device in accordance with particular, usually predetermined, communication protocols and parameters. The transceiver equipment similar demodulates and possibly decodes and decrypts, if necessary, any communication signals received from the wireless communications device 102 transmitting within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and wireless communications device 102. An RF channel is a limited resource that must be conserved, typically due limits in overall bandwidth and a limited battery power of the wireless device 102. Those skilled in the art will appreciate that a wireless network in actual practice may include hundreds of cells, each served by a station 118, depending upon desired overall expanse of network coverage. All pertinent components may be connected by multiple switches and routers (not shown), controlled by multiple network controllers.

For all wireless communications devices 102 registered with a network operator, permanent data (such as the user profile associated with each device) as well as temporary data (such as the current location of the device) are stored in the HLR 132. In case of a voice call to the wireless device 102, the HLR 132 is queried to determine the current location of the device 102. A Visitor Location Register (VLR) of MSC 122 is responsible for a group of location areas and stores the data of those wireless devices that are currently in its area of responsibility. This includes parts of the permanent data that have been transmitted from HLR 132 to the VLR for faster access. However, the VLR of MSC 122 may also assign and store local data, such as temporary identifications. Optionally, the VLR of MSC 122 can be enhanced for more efficient coordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of wireless devices 102. SGSN 126 also performs security functions and access control. Gateway GPRS Support Node (GGSN) 128 provides internetworking with external packet-switched networks and is connected with SGSN's (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by wireless device 102 or by the transceiver equipment instructing the wireless device to select a particular cell. The wireless device 102 informs wireless network 104 when it reselects another cell or group of cells, known as a routing area.

In order to access GPRS services, the wireless device 102 first makes its presence known to wireless network 104 by performing what is known as a GPRS "attach". This operation establishes a logical link between the wireless device 102 and SGSN 126 and makes the wireless device 102 available to receive, for example, pages via SGSN, notifications of incoming GPRS data, or SMS messages over GPRS. In order to send and receive GPRS data, the wireless device 102 assists in activating the packet data address that it wants to use. This operation makes the wireless device 102 known to GGSN 128; internetworking with external data networks can thereafter commence. User data may be transferred transparently between the wireless device 102 and the external data networks using, for example, encapsulation and tunneling. Data packets are equipped with GPRS-specific protocol information and transferred between wireless device 102 and GGSN 128.

Those skilled in the art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
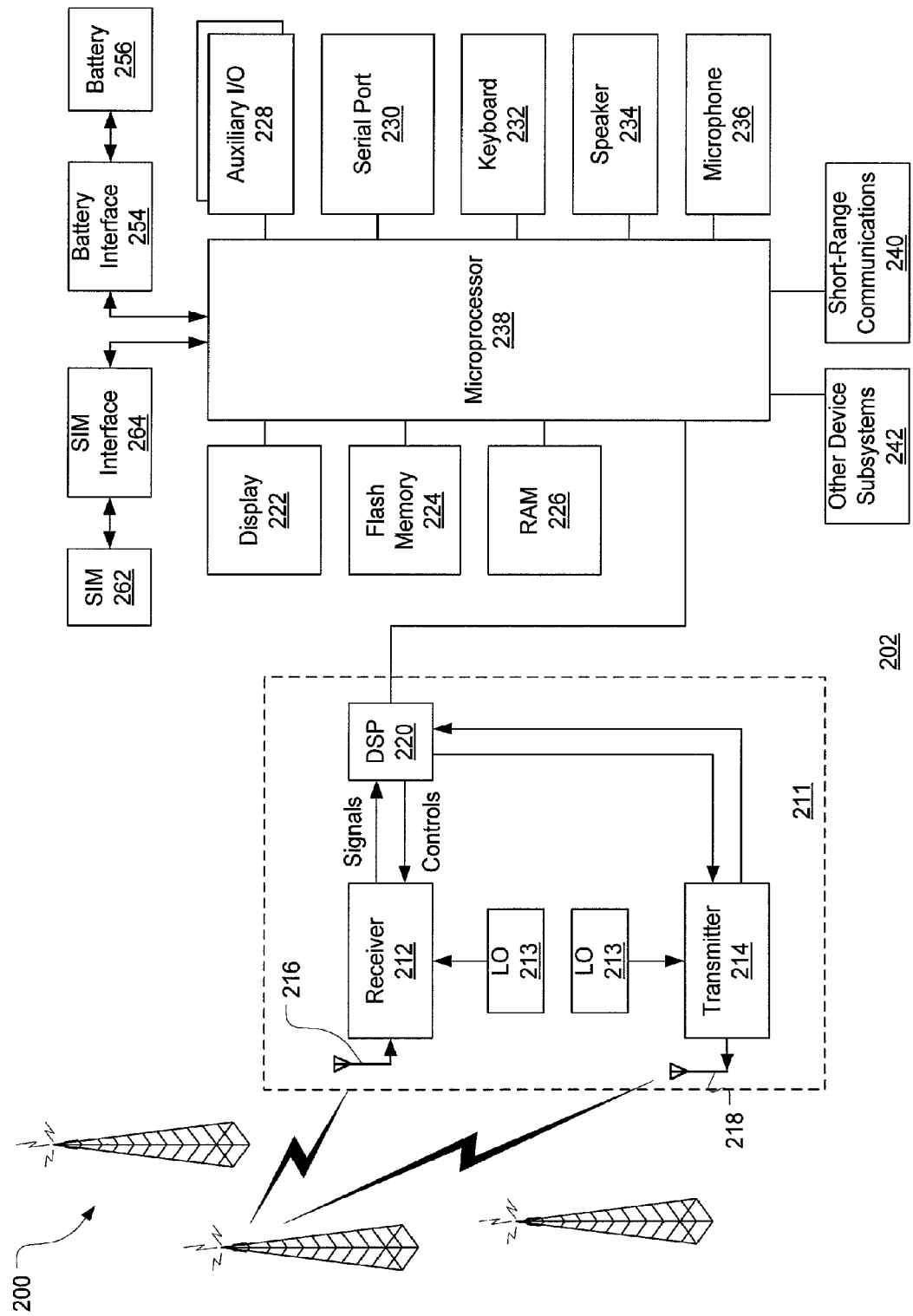
FIG. 2 is a more detailed block diagram of a wireless communications device on which the present technology can be implemented.

FIG. 2 is a detailed block diagram of a preferred wireless communications device 202. The wireless device 202 is preferably a two-way communication device having at least voice and advanced data communication capabilities, including the capability to communicate with other computer systems. Depending on the functionality provided by the wireless device 202, it may be referred to as a data messaging device, a two-way pager, a cellular telephone with data message capabilities, a wireless Internet appliance, or a data communications device (with or without telephony capabilities). The wireless device 202 may communicate with any one of a plurality of fixed transceiver stations 200 within its geographic coverage area.

The wireless communications device 202 will normally incorporate a communication subsystem 211, which includes a receiver 212, a transmitter 214, and associated components, such as one or more (preferably embedded or internal) antenna elements 216 and 218, local oscillators (LO's) 213, and a processing module such as a digital signal processor (DSP) 220. Communication subsystem 211 is analogous to RF transceiver circuitry 108 and antenna 110 shown in FIG. 1. As will be apparent to those skilled in the field of communications, the particular design of communication subsystem 211 depends on the communication network in which the wireless device 202 is intended to operate.

The wireless device 202 may send and receive communication signals over the network after required network registration or activation procedures have been completed. Signals received by antenna 216 through the network are input to receiver 212, which may perform common receiver functions as signal amplification, frequency down conversion, filtering, channel selection, and the like, and, as shown in the example of FIG. 2, analog-to-digital (A/D) conversion. A/D conversion of a received signal allows more complex communication functions such as demodulation and decoding to performed in the DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in the DSP 220.

Network access is associated with a subscriber or user of the wireless device 202, and therefore the wireless device requires a Subscriber Identity Module or SIM card 262 to be inserted in a SIM interface 264 in order to operate in the network. SIM 262 includes those features described in relation to FIG. 1. Wireless device 202 is a battery-powered device so it also includes a battery interface 254 for receiving one or more rechargeable batteries 256. Such a battery 256 provides electrical power to most if not all electrical circuitry in the device 102, and battery interface provides for a mechanical and electrical connection for it. The battery interface 254 is coupled to a regulator (not shown) which provides a regulated voltage V to all of the circuitry.

Wireless communications device 202 includes a microprocessor 238 (which is one implementation of controller 106 of FIG. 1) which controls overall operation of wireless device 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-board functions. Notably, some subsystems, such as keyboard 232 and display 222, for example, may be used for both communication-related functions, such as entering a text message for transmission over a communication network, and device-resident functions such as a calculator or task list. Operating system software used by the microprocessor 238 is preferably stored in a persistent (non-volatile) store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, enables execution of software applications on the wireless device 202. A predetermined set of applications which control basic device operations, including at least data and voice communication applications, will normally be installed on the device 202 during its manufacture. For example, the device may be pre-loaded with a personal information manager (PIM) having the ability to organize and manage data items relating to the user's profile, such as e-mail, calendar events, voice mails, appointments, and task items. Naturally, one or more memory stores are available on the device 202 and SIM, 256 to facilitate storage of PIM data items and other information.

The PIM application preferably has the ability to send and receive data items via the wireless network. PIM data items may be seamlessly integrated, synchronized, and updated via the wireless network, with the wireless device user's corresponding data items stored and/or associated with a host computer system thereby creating a mirrored host computer on the wireless device 202 with respect to such items. This is especially advantageous where the host computer system is the wireless device user's office computer system. Additional applications may also be loaded into the memory store(s) of the wireless communications device 202 through the wireless network, the auxiliary I/O subsystem 228, the serial port 230, short-range communications subsystem 240, or any other suitable subsystem 242, and installed by a user in RAM 226 or preferably a non-volatile store (not shown) for execution by the microprocessor 238. Such flexibility in application installation increases the functionality of the wireless device 202 and may provide enhanced onboard functions, communication-related functions or both. For example, secure communication applications may enable electronic commerce functions and other such financial transactions to be performed using the wireless device 202.

In a data communication mode, a received signal such as a text message, an e-mail message, or a web page download will be processed by communication subsystem 211 and input to microprocessor 238. Microprocessor 238 will preferably further process the signal for output to display 222 or alternatively to auxiliary I/O device 228. A user of the wireless device 202 may also compose data items, such as email messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of the wireless communications device 202 is substantially similar, except that the received signals would be output to speaker 234 and signals for transmission would be generated by microphone 236. Alternative voice or audio I/O subsystems, such as a voice message recording subsystem, may also be implemented on the wireless device 202. Although voice or audio signal output is preferably accomplished primarily through speaker 234, display 222 may also be used to provide an indication of the identity of the calling party, duration on a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of wireless device 202 by providing for information or software downloads to the wireless device 202 other than through the wireless network. The alternate download path may, for example, be used to load an encryption key onto the wireless device 202 through a direct and thus reliable and trusted connection to thereby provide secure device communications.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a trademark of Bluetooth SIG, Inc.

Figure 3A:
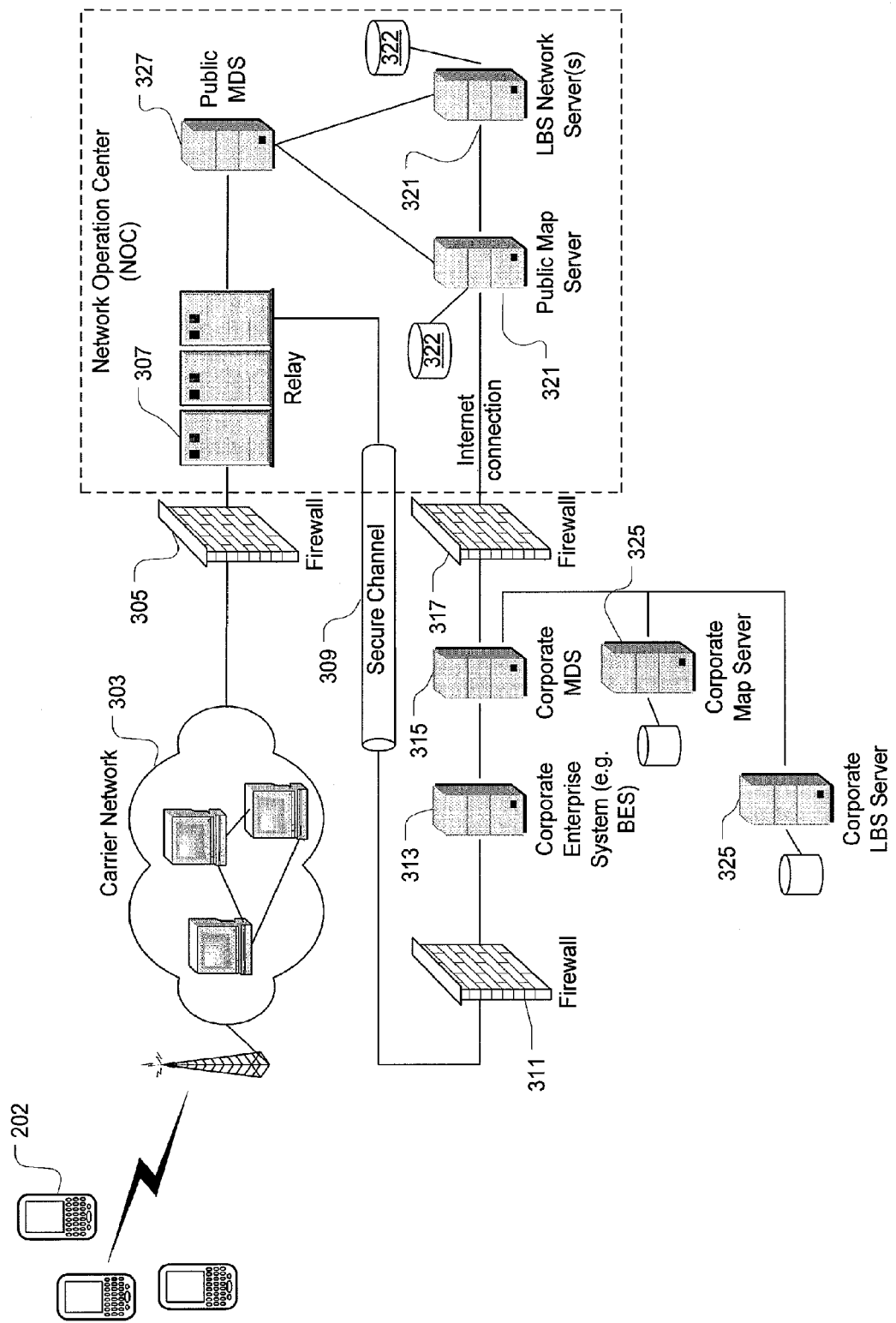
FIG. 3A is a system diagram of exemplary network components which provide mapping functionality in the wireless communications devices of FIG. 1 and FIG. 2.

FIG. 3A is a system diagram of network components which provide mapping functionality in the wireless communication devices of FIGS. 1 and 2. To achieve this, a mapping application is also provided in memory of the wireless communications device for rendering visual maps in its display. Wireless communications devices 202 are connected over a mobile carrier network 303 for communication through a firewall 305 to a relay 307. A request for map data from any one of the wireless communications devices 202 is received at relay 307 and passed via a secure channel 309 through firewall 311 to a corporate enterprise server 313 and corporate mobile data system (MDS) server 315. The request is then passed via firewall 317 to a public map server and/or to a public location-based service (LBS) server 321 which provides location-based services (LBS) to handle the request. The network may include a plurality of such map servers and/or LBS servers where requests are distributed and processed through a load distributing server. The map/LBS data may be stored on this network server 321 in a network database 322, or may be stored on a separate map server and/or LBS server (not shown). Private corporate data stored on corporate map/LBS server 325 may be added to the public data via corporate MDS server 315 on the secure return path to the wireless device 202. Alternatively, where no corporate servers are provided, the request from the wireless device 202 may be passed via relay 307 to a public MDS server 327, which sends the request to the public map/LBS server 321 providing map data or other local-based service in response to the request. For greater clarity, it should be understood that the wireless devices can obtain map data from a "pure" map server offering no location-based services, from an LBS server offering location-based services in addition to map content, or from a combination of servers offering map content and LBS.

A Maplet data structure is provided that contains all of the graphic and labelled content associated with a geographic area (e.g. map features such as restaurants (point features), streets (line features) or lakes (polygon features)). Maplets are structured in Layers of Data Entries ("DEntries") identified by a "Layer ID" to enable data from different sources to be deployed to the device and meshed for proper rendering. Each DEntry is representative of one or more artifact or label (or a combination of both) and includes coordinate information (also referred to as a "bounding box" or "bounding area") to identify the area covered by the DEntry and a plurality of data points that together represent the artifact, feature or label. For example, a DEntry may be used to represent a street on a city map (or a plurality of streets), wherein the various points within the DEntry are separated into different parts representing various portions of the artifact or map feature (e.g. portions of the street). A wireless device may issue a request for the map server to download only those DEntries that are included within a specified area or bounding box representing an area of interest that can be represented by, for example, a pair of bottom left, top right coordinates.

Figure 3B:
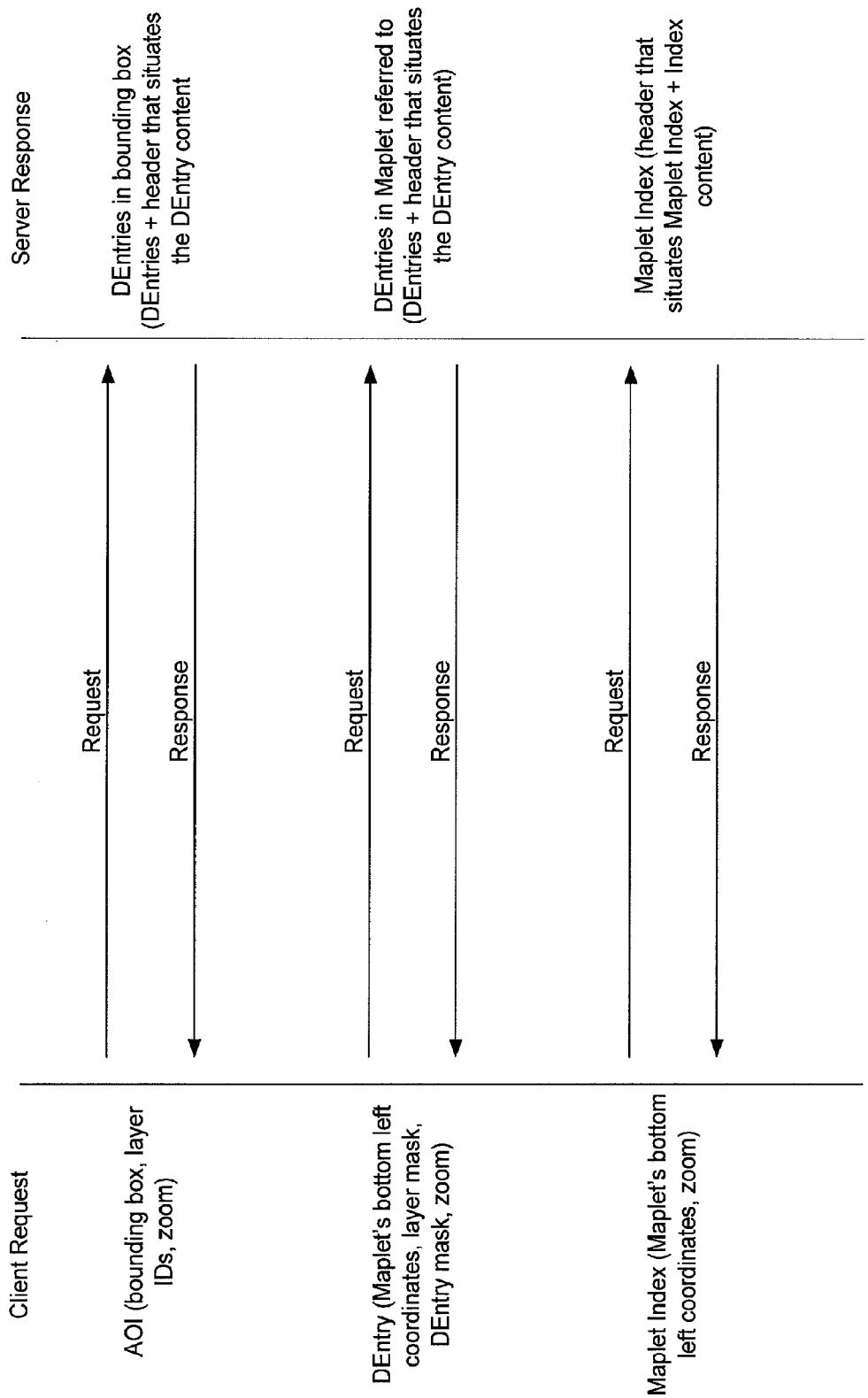
FIG. 3B illustrates, by way of example, a message exchange between a wireless communications device and a map server for downloading map content to the wireless communications device based on the system of FIG. 3A.

As depicted in FIG. 3B, the wireless communications device issues one or more AOI (Area of Interest) requests, DEntry or data requests and Maplet Index requests to the map server for selective downloading of map data based on user context. Thus, rather than transmitting the entire map data for an area in reply to each request from the device (which burdens the wireless link), local caching may be used in conjunction with context filtering of map data on the server. For example, if a user's wireless device is GPS enabled and the user is traveling in an automobile at 120 km/h along a freeway then context filtering can by employed to prevent downloading of map data relating to passing side streets. Or, if the user is traveling in an airplane at 30,000 feet, then context filtering can be employed to prevent downloading of map data for any streets whatsoever. Also, a user's context can be defined, for example, in terms of occupation, e.g. a user whose occupation is a transport truck driver can employ context filtering to prevent downloading of map data for side streets on which the user's truck is incapable of traveling, or a user whose occupation is to replenish supplied of soft drink dispensing machines can employ context filtering to download public map data showing the user's geographical area of responsibility with irrelevant features such as lakes and parks filtered out and private map data containing the location of soft drink dispensing machines superimposed on the public map data.

The Maplet Index request results in a Maplet Index (i.e. only a portion of the Maplet that provides a table of contents of the map data available within the Maplet rather than the entire Maplet) being downloaded from the map server to the device, thereby conserving OTA (Over-the-Air) bandwidth and device memory caching requirements. The Maplet Index conforms to the same data structure as a Maplet, but omits the data points. Consequently, the Maplet Index is small (e.g. 300-400 bytes) relative to the size of a fully populated Maplet or a conventional bit map, and includes DEntry bounding boxes and attributes (size, complexity, etc.) for all artifacts within the Maplet. As the field of view changes (e.g. for a location-aware device that displays a map while moving), the device (client) software assesses whether or not it needs to download additional data from the server. Thus, if the size attribute or complexity attribute of an artifact that has started to move into the field of view of the device (but is not yet being displayed) is not relevant to the viewer's current context, then the device can choose not to display that portion of the artifact. On the other hand, if the portion of the artifact is appropriate for display, then the device accesses its cache to determine whether the DEntries associated with that portion of the artifact have already been downloaded, in which case the cached content is displayed. Otherwise, the device issues a request for the map server to download all the of the DEntries associated with the artifact portion.

By organizing the Maplet data structure in Layers, it is possible to seamlessly combine and display information obtained from public and private databases. For example, it is possible for the device to display an office building at a certain address on a street (e.g. a 1.sup.st z-order attribute from public database), adjacent a river (e.g. a 2nd z-order attribute from public database), with a superimposed floor plane of the building to show individual offices (e.g. 11th z-order attribute from a private database, accessible through a firewall).

Referring back to FIG. 3A, within the network having map server(s) and/or LBS server(s) 321 and database(s) 322 accessible to it, all of the map data for the entire world is divided and stored as a grid according to various levels of resolution (zoom), as set forth below in Table A. Thus, a single A-level Maplet represents a 0.05×0.05 degree grid area; a single B-level Maplet represents a 0.5×0.5 degree grid area; a single C-level Maplet represents a 5×5 degree grid area; a single D-level Maplet represents a 50×50 degree grid area; and a single E level Maplet represents the entire world in a single Maplet. It is understood that Table A is only an example of a particular Maplet grid division; different grid divisions having finer or coarser granularity may, of course, be substituted.

A Maplet includes a set of layers, with each layer containing a set of DEntries, and each DEntry containing a set of data points.

TABLE A

| Level | Grid (degrees) | # of Maplets to cover the World | # of Maplets to cover North America | # of Maplets to cover Europe |
|---|---|---|---|---|
| A | 0.05 × 0.05 | 25,920,000 | 356,000 | 100,000 |
| B | 0.5 × 0.5 | 259,200 | 6,500 | 1000 |
| C | 5 × 5 | 2,592 | 96 | 10 |
| D | 50 × 50 | 32 | 5 | 5 |
| E | World | 1 | 1 | 1 |

As mentioned above, three specific types of requests may be generated by a wireless communications device (i.e. the client)—AOI requests, DEntry requests and Maplet Index requests. The requests may be generated separately or in various combinations, as discussed in greater detail below. An AOI (area of interest) request calls for all DEntries in a given area (bounding box) for a predetermined or selected set of z-order Layers. The AOI request is usually generated when the device moves to a new area so as to fetch DEntries for display before the device client knows what is available in the Maplet. The Maplet Index has the exact same structure as a Maplet but does not contain complete DEntries (i.e. the data Points actually representing artifacts and labels are omitted). Thus, a Maplet Index defines what Layers and DEntries are available for a given Maplet. A data or DEntry request is a mechanism to bundle together all of the required DEntries for a given Maplet.

Typically, AOI and Maplet Index requests are paired together in the same message, although they need not be, while DEntry requests are generated most often. For example, when a wireless device moves into an area for which no information has been stored on the device client, the Maplet Index request returns a Maplet Index that indicates what data the client can specifically request from the server 321, while the AOI request returns any DEntries within the area of interest for the specified Layers (if they exist). In the example requests shown on FIG. 3B, the desired Maplet is identified within a DEntry request by specifying the bottom-left Maplet coordinate. In addition, the DEntry request may include a layer mask so that unwanted Layers are not downloaded, a DEntry mask so that unwanted data Points are not downloaded, and zoom values to specify a zoom level for the requested DEntry. Once the device client has received the requested Maplet Index, the client typically then issues multiple DEntry requests to ask for specific DEntries (since the client knows all of the specific DEntries that are available based on the Maplet Index).

In this particular implementation, a collection of 20×20 A-level Maplets (representing a 1×1 degree square) is compiled into a Maplet Block File (.mbl). An .mbl file contains a header which specifies the offset and length of each Maplet in the .mbl file. The same 20×20 collection of Maplet index data is compiled into a Maplet Index file (.mbx). The .mbl and .mbx file structures are set forth in Tables B and C, respectively.

TABLE B

| Address Offset | Offset | Length |
|---|---|---|
| 0x000 | Maplet #0 Offset (4 bytes) | Maplet #0 Length (4 bytes) |
| 0x008 | Maplet #1 Offset | Maplet #1 Length |

TABLE B-continued

| Address Offset | Offset | Length |
|---|---|---|
| 0x010 | Maplet #2 Offset | Maplet #2 Length |
| ... | ... | ... |
| 0xC78 | Maplet #399 Offset | Maplet #399 Length |
| 0xC80 | Beginning of Maplet #0 | |
| 0xC80 + Size of Maplet #0 | Beginning of Maplet #1 | |
| 0xC80 + Size of Maplet #0 + #1 | Beginning of Maplet #2 | |
| ... | ... | |
| 0xC80 + Σ of Size of Maplets (#0:#398) | Beginning of Maplet #399 | |

In Table B, the offset of Maplet #0 is 0x0000_0000 since, in this particular example, the data structure is based on the assumption that the base address for the actual Maplet data is 0x0000_0080. Therefore the absolute address for Maplet #0 data is: Maplet #0 Address=Base Address (0x0000_0080)+ Maplet #0 Offset (0x0000_0000), and additional Maplet addresses are calculated as: Maplet #(n+1) Offset=Maplet #(n) Offset+Maplet #(n) Length. If a Maplet has no data or does not exist, the length parameter is set to zero (0x0000_0000).

TABLE C

| Address Offset | Offset (4 bytes) | Length (4 bytes) |
|---|---|---|
| 0x000 | Maplet Index #0 Offset | Maplet Index #0 Length |
| 0x008 | Maplet Index #1 Offset | Maplet Index #1 Length |
| 0x010 | Maplet Index #2 Offset | Maplet Index #2 Length |
| ... | ... | ... |
| 0xC78 | Maplet Index #399 Offset | Maplet Index #339 Length |
| 0xC80 | Beginning of Maplet Index #0 | |
| 0xC80 + Size of Maplet Index #0 | Beginning of Maplet Index #1 | |
| 0xC80 + Size of Maplet Index #0 + #1 | Beginning of Maplet Index #2 | |
| ... | ... | |
| 0xC80 + Σ of Size of Maplet Indices (#0:#399) | Beginning of Maplet Index #399 | |

In Table C, the offset of Maplet Index #0 is 0x0000_0000 since, according to an exemplary embodiment the data structure is based on the assumption that the base address for the actual Maplet index data is 0x0000_0080. Therefore, the absolute address for Maplet Index #0 data is: Maplet Index #0 Address=Base Address (0x0000_0080)+Maplet Index #0 Offset (0x0000_0000), and additional Maplet index addresses are calculated as: Maplet Index #(n+1) Offset=Maplet Index #(n) Offset+Maplet Index #(n) Length. If a Maplet Index has no data or does not exist, the length parameter is set to zero (0x0000_0000).

Figure 3C:
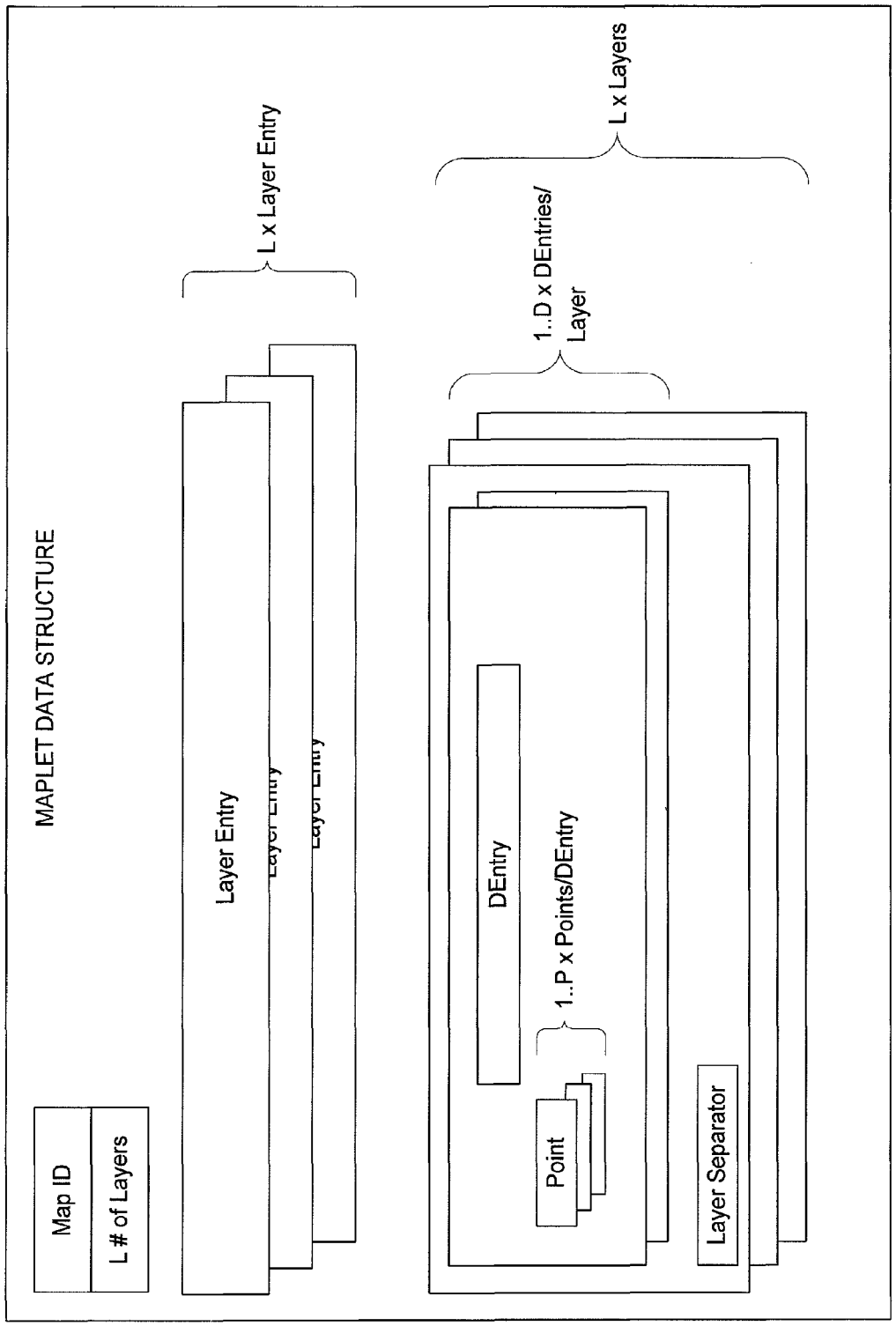
FIG. 3C is a diagram showing a preferred Maplet data structure.

FIG. 3C and Table D (below), in combination, illustrate, by way of example only, a basic Maplet data structure. Generally, as noted above, the Maplet data structure can be said to include a Maplet Index (i.e. an index of the DEntries, each of which is representative of either an artifact or a label or both) together with data Points for each DEntry that actually form such artifacts and labels. In this example, each Maplet includes a Map ID (e.g. 0xA1B1C1D1), the # of Layers in the Maplet, and a Layer Entry for each Layer. The Map ID identifies the data as a valid Maplet, and according to one alternative, may also be used to identify a version number for the data. The # of Layers is an integer which indicates the number of Layers (and therefore Layer Entries) in the Maplet. Each Layer Entry defines rendering attributes and is followed by a list of DEntries for each Layer. The above forms a Maplet Index. For a complete Maplet, each DEntry contains a set of data Points (referred to herein as Points) or Labels). It will be noted that Layers can have multiple DEntries and the complete list of DEntries and Points are grouped by Layer and separated by a Layer Separator (e.g. hex value 0xEEEEEEEE) In this example, each Layer Entry is 20 bytes long, and a DEntry is 12 bytes long. However, the number of Layers, number of DEntries per Layer and the number of Points per DEntry depends on the map data and is generally variable.

Table D provides a high "byte-level" description of a Maplet for this example.

TABLE D

| Data | Quantity | Total # of Bytes |
|---|---|---|
| Map ID | 1 | 4 bytes |
| # of Layers | 1 | 4 bytes |
| Layer Entries | # of Layers | 20 bytes × (# of Layers) |
| DEntry of a Layer | x (# of DEntries in a Layer) | # of Layers | 12 bytes × (Σ of the # of DEntries in each Layer) + |
| Points for DEntry of a Layer | | | 4 bytes × (Σ of the # of Points in each DEntry in each Layer) + |
| Layer Separator | | 4 bytes × (# of Layers) |

Figure 4:
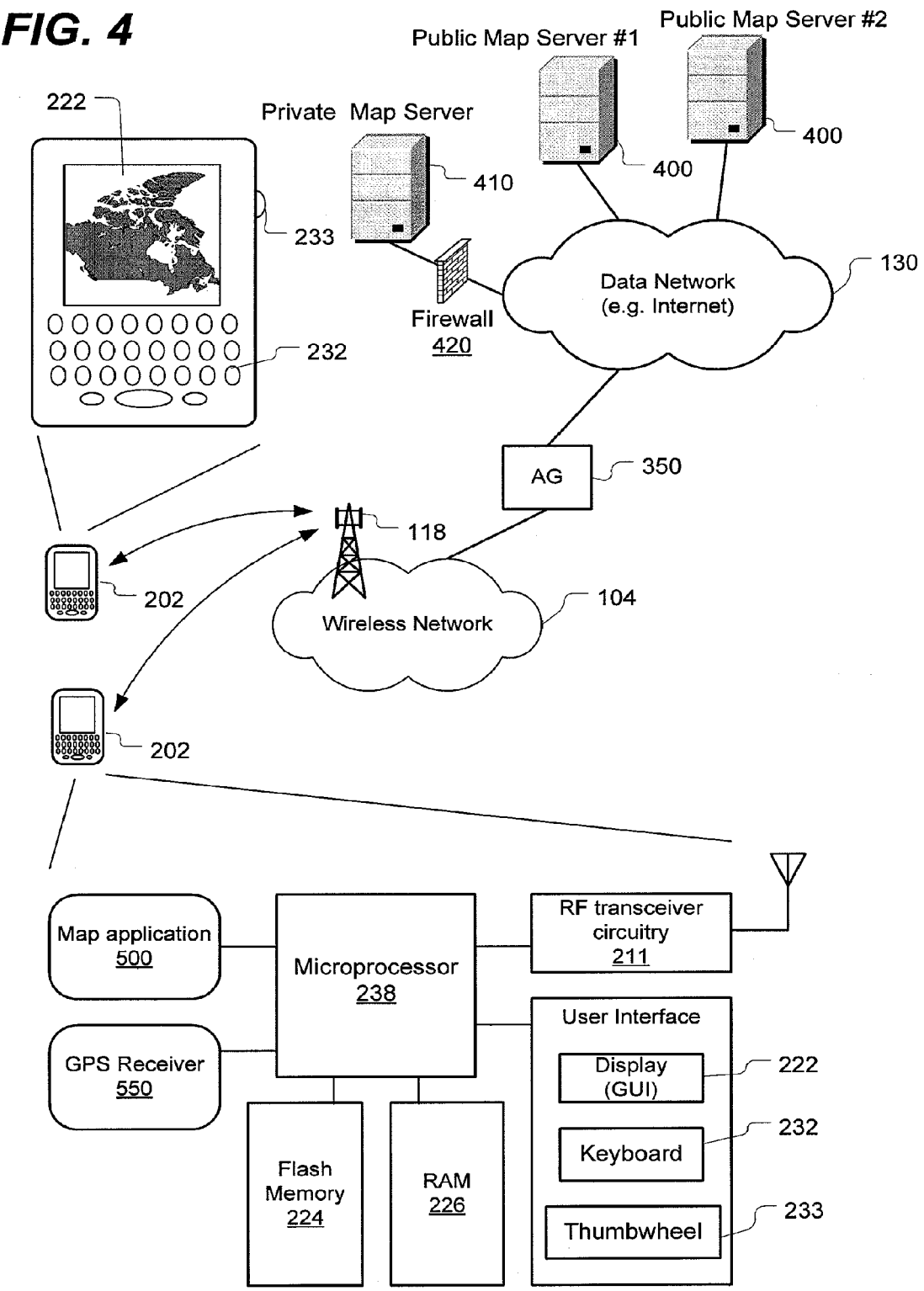
FIG. 4 is a schematic depiction of another example of a wireless network having an applications gateway for optimizing the downloading of map data from map servers to wireless communications devices on which the present technology can be implemented.

By way of a further example, the wireless network 200 depicted in FIG. 4 can include an applications gateway (AG) 350 for optimizing data flow for onboard applications such as a mapping application 500 stored in memory (e.g. stored in a flash memory 224) and executable by the microprocessor 238 of the wireless device 202.

As shown in FIG. 4, the wireless network 200 hosts a plurality of handheld wireless communications devices 202 (such as the BlackBerry® by Research in Motion Limited) having voice and data capabilities (for both e-mail and web browsing) as well as a full QWERTY keyboard. These wireless communications devices 202 can access Web-based map data on public map servers 400 hosted on the Internet or other data network 130 via the applications gateway (AG) 350 which mediates and optimizes data flow between the wireless network 200 and the data network by performing various mappings, compressions and optimizations on the data.

The map server extracts generic map content from a Geographical Information Systems (GIS) map database (e.g. NavTech®, TelAtlas®, etc.) at a specified level of resolution (zoom level). Custom graphics associated with the query, such as highlighted route, pushpin for current position or street address, etc. are post-processed and merged by the server with the generic map content. Relevant screen graphics are then labelled, and the merged map graphic is compressed and delivered to the device for display.

In operation, a user of the wireless communications device 202 uses an input device such as keyboard 232 and/or thumbwheel/trackball 233 to cause the microprocessor 238 to open the map application 500 stored in the memory 224. Using the keyboard 232 and thumbwheel/trackball 233, the user specifies a map location on the map application 500. In response to this request/command, the microprocessor 238 instructs the RF transceiver circuitry 211 to transmit the request over the air through the wireless network 104. The request is processed by the AG 350 and forwarded into the data network (Internet) using standard packet-forwarding protocols to one or more of the public and/or private map servers 400, 410.

Accessing a private map server 410 behind a corporate firewall 420 was described above with reference to FIG. 3A. Map data downloaded from these one or more map servers 400, 410 is then forwarded in data packets through the data network and mapped/optimized by the AG 350 for wireless transmission through the wireless network 104 to the wireless communications device 202 that originally sent the request.

The downloaded map data can be cached locally in RAM 226, and displayed on the display 222 or graphical user interface (GUI) of the device after the map application 500 reconstructs or "stitches together" portions of features or constituent path segments to generate a reconstructed map feature or path, in a client-side implementation as will elaborated below, so that a single instance of the label can be centrally rendered for the reconstructed feature or path (provided it does not collide with another label of higher priority). Alternatively, server-side pre-stitching can be performed to eliminate redundant labels, thus alleviating both onboard processing and OTA bandwidth requirements. If a further request is made by the user (or if the user wants a change in the field of view by zooming or panning), the device will check whether the data required can be obtained from the local cache (RAM 226). If not, the device issues a new request to the one or more map servers 400, 410 in the same manner as described above.

As described earlier, map data can optionally be downloaded first as a Maplet Index enabling the user to then choose which DEntries listed in the Index to download in full. Furthermore, as described earlier, the map application can include user-configurable context filtering that enables the user to filter out unwanted map features or artifacts by not downloading specific DEntries corresponding to those unwanted map features or artifacts.

As a variant, the wireless communications device can optionally include a Global Positioning System (GPS) receiver ("GPS chip") 550 for providing location-based services (LBS) to the user in addition to map content. Embedding a GPS chip 550 capable of receiving and processing signals from GPS satellites enable the GPS chip to generate latitude and longitude coordinates, thus making the device "location aware". To obtain local-based services, the map application within the wireless communications device sends a request to the map server for information relating to a city, restaurant, street address, route, etc. If the device is "location aware", the request would include the current location of the device.

In lieu of, or in addition to, GPS coordinates, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell.

Figure 5A:
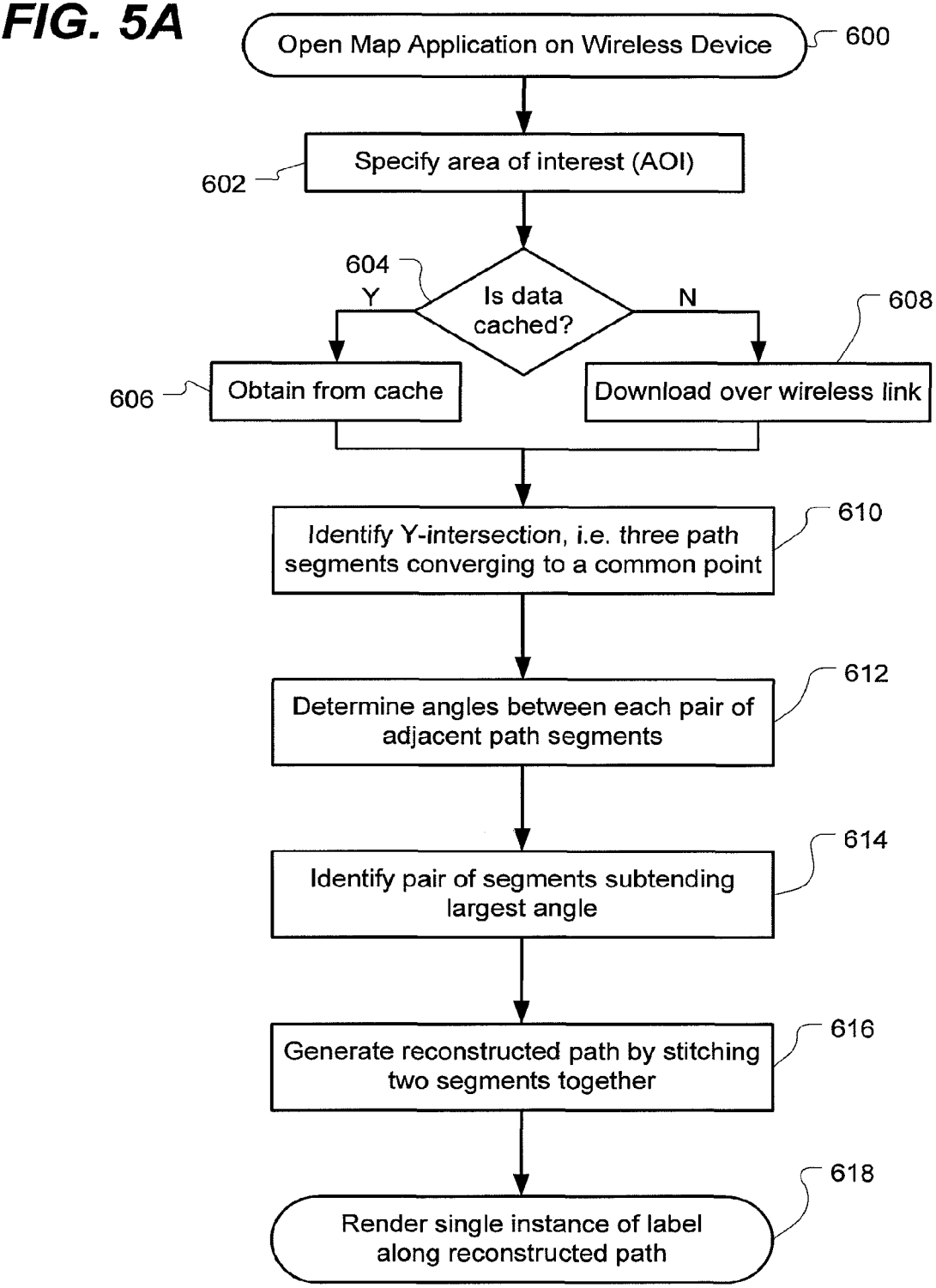
FIG. 5A is a flowchart presenting steps of a method of displaying a map on a wireless device by stitching together on the client side the two path segments subtending the largest angle in a Y-intersection to generate a reconstructed path along which a single label is rendered.
Figure 5B:
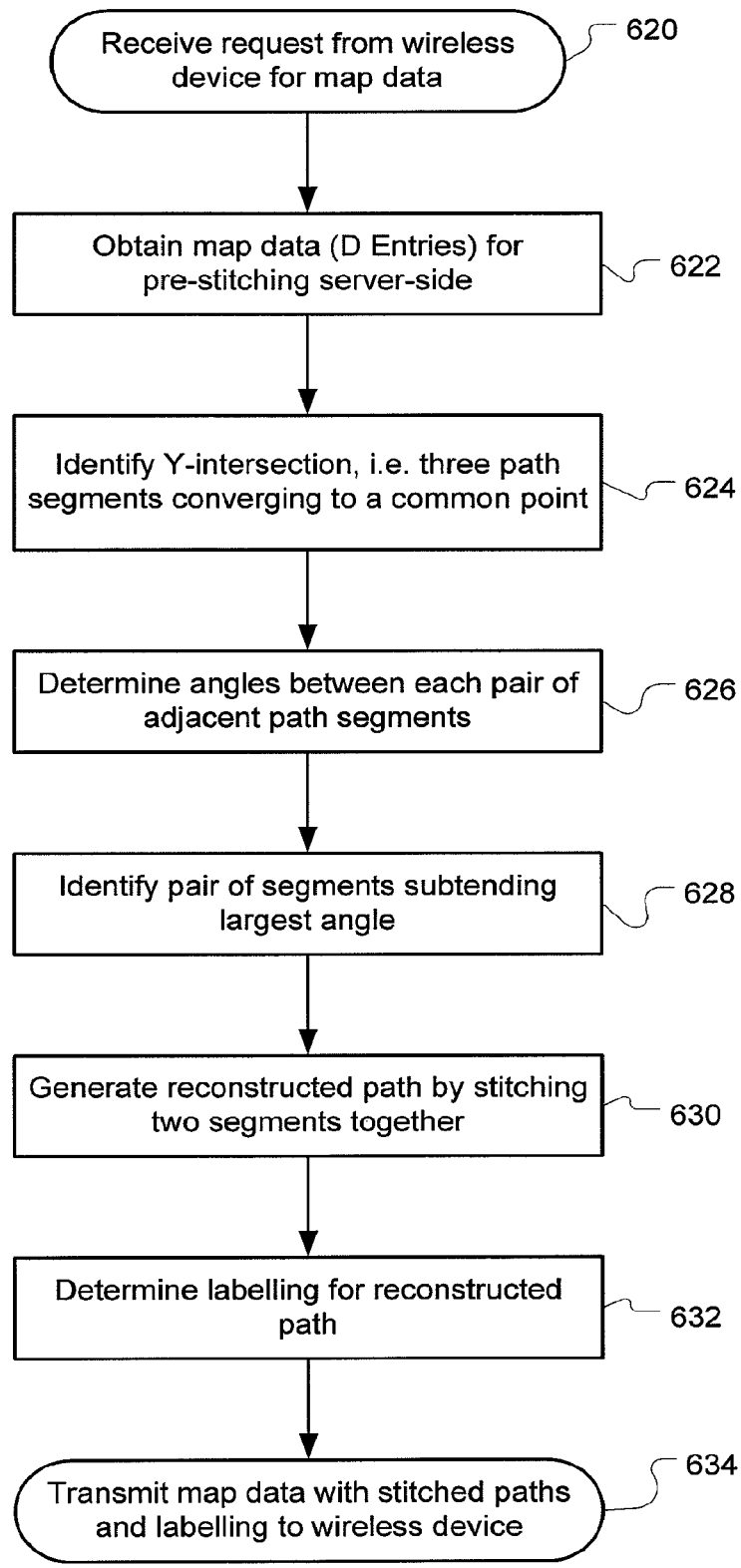
FIG. 5B is a flowchart presenting steps of a method of displaying a map on a wireless device by pre-stitching on the server side the two path segments subtending the largest angle in a Y-intersection to generate a reconstructed path along which a single label is rendered.

Operation of the systems described above will now be described with reference to the method steps depicted in the flowcharts of FIGS. 5A and 5B. FIG. 5A depicts a method of stitching paths that is done client-side, i.e. on the device whereas FIG. 5B depicts a method of "pre-stitching" performed server side, which economizes over-the-air (OTA) bandwidth and avoids having to perform label angle calculations on the device. As depicted in FIG. 5A, the first method of displaying a map on a wireless communications device includes initial steps of opening the map application on the device (step 600) and specifying an area of interest (AOI) using the map application (step 602), e.g. specifying a street address, coordinates of latitude or longitude, or clicking on a location on a world map, etc. In response to the specifying of an AOI, map data is then obtained (step 604) for rendering the map to be displayed on the wireless communications device. For the purposes of this specification, "providing map data" means either providing the data to a server (for "pre-stitching") or obtaining data at the client device by receiving or downloading the map data over the air, i.e. over a wireless link, retrieving the map data from a local cache, or downloading the map data over a wired connection, or any combination thereof. In other words, as depicted in FIG. 5A, obtaining map data includes steps of determining whether the data is already cached locally (step 604). If the data is locally cached, the map data is retrieved from the cache (step 606). Otherwise, if not all of the map data is cached, then the map data is downloaded over the air (step 608).

As depicted in FIG. 5A, once the map data is obtained, the device identifies (step 610) at least three path segments that converge to a common point on the map, wherein each of the path segments has an identical label. A point where three path segments having the same label converge is referred to herein as a "Y-intersection", i.e. the point of convergence where a path splits/divides/bifurcates (or, conversely, where a divided path merges). Identifying a Y-intersection can be done by compiling a list of segments and their respective labels and then determining whether there are three (or potentially more) segments having the same label and sharing a common endpoint. If that is the case, then a Y-intersection exists and is flagged. As further depicted in FIG. 5A, after identifying a Y-intersection or a point where three path segments having the same label converge, the method then entails a step 612 of determining an angle subtended by each pair of adjacent path segments in order to identify (step 614) which pair of adjacent path segments subtends the largest angle. Once this pair of paths having the largest angle is identified, the method entails a step 616 of generating a reconstructed path by stitching together the pair of adjacent path segments subtending the largest angle, followed by a step 618 of rendering a single instance of the label along the reconstructed path.

FIG. 5B presents a method of pre-stitching the paths server-side, which is more efficient that the method of FIG. 5B because it conserves scarce OTA bandwidth and onboard processing capacity. As depicted, an initial step 620 entails receiving a request from a wireless communications device for map data. At step 622, map data (e.g. in the form of D Entries from one or more Maplets) is obtained to enable the server to pre-stitch the path segments. The server then identifies any Y-intersections having three or more converging path segments (step 624), determines angles between each pair of adjacent path segments (step 626), and then identifies the pair of segments subtending the largest angle (step 628). Once this is done, the server stitches the path segments to generate a reconstructed path (step 630) and determines labelling (step 632) for the reconstructed path by, for example, eliminating redundant labels. By eliminating redundant labels at the server side, less label data has to be transmitted wirelessly to the client device. Furthermore, by eliminating redundant labels server side, the device does not need to expend valuable processing capacity determining whether there are redundant labels and which of these redundant labels should be discarded. Finally, as shown in FIG. 5B, the map data with the stitched paths (including its pared-down label data) is transmitted wirelessly to the device (step 634) which can then efficiently render the stitched paths and associated labels.

Regardless whether client-side stitching (FIG. 5A) or the more efficient server-side pre-stitching (FIG. 5B) is performed, the rendering of labels can further include a step (not shown in these flowcharts) of verifying that the labels do not interfere with other labels. For example, this step of verifying that the labels do not interfere with other labels may involve a step of generating a collision-avoidance array representative of the map to be rendered for provisionally testing potential map positions prior to actually rendering the map. This "virtual rendering" enables the map application to ascertain that labels do not collide (conflict) or overlap with other labels for which a map position has been previously assigned.

For the purposes of this specification, "label" includes not only all conventional forms of labels, such as city names, street names, etc, but also any symbols or icons, such as highway number icons, or symbols or icons used to denote airports, tourist information kiosks, campgrounds, ferry crossings, etc. on large scale (regional) maps or restaurants, hotels, bus stations, etc. on city maps.

For the purposes of this specification, a "path" includes a road, street, highway, bicycle path, walkway or other route and also includes waterway features such as a river, lake, bay, strait or any body of water for which three or more segments or constituent elements may converge, each having the same label as a result of being obtained from separate sets of map data for which individual labels are provided.

Figure 6:
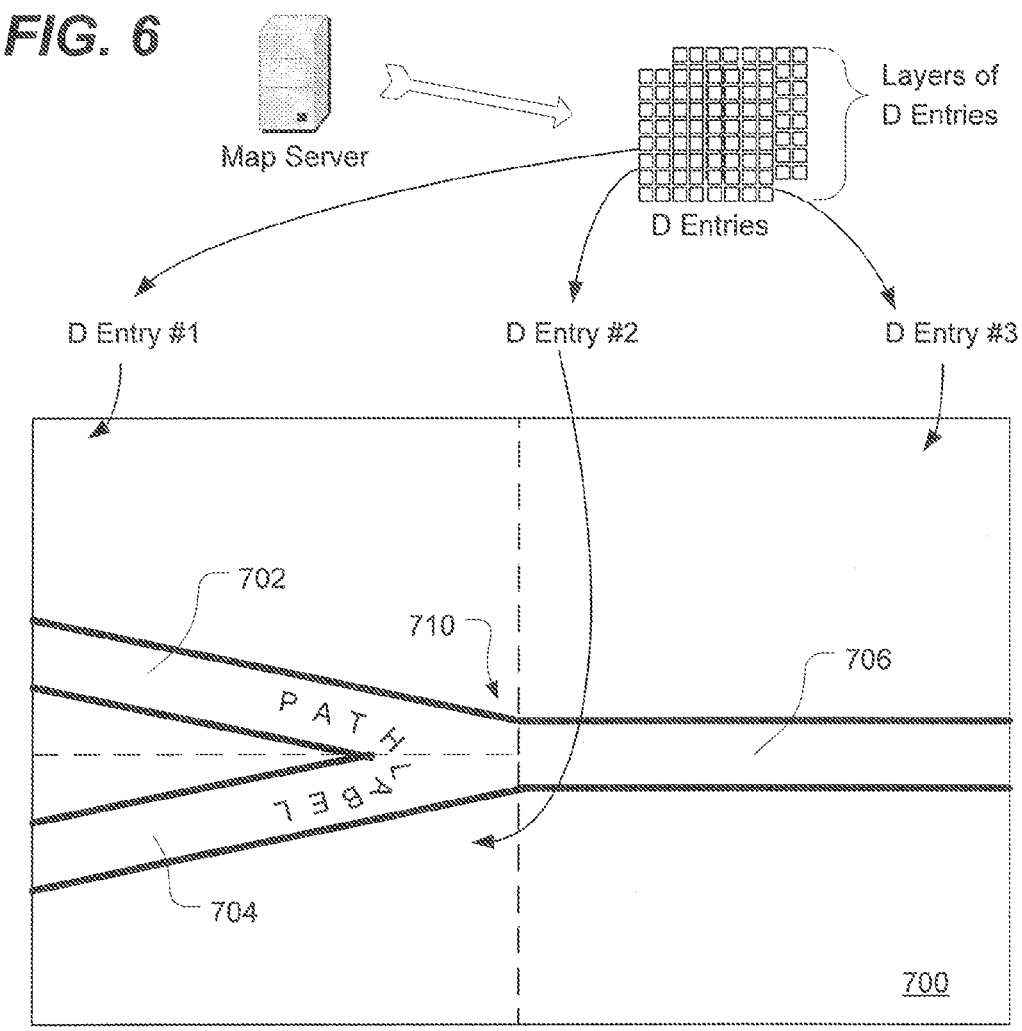
FIG. 6 schematically depicts the potential difficulties of labelling a Y-intersection that may be encountered when path segments of a Y-intersection are randomly stitched.

FIG. 6 schematically depicts the process of reconstructing ("stitching") paths and/or map features either server-side or client-side in order to efficiently generate aesthetically-labelled maps for being displayed on wireless communications devices. By way of overview, for client-side stitching, map data (which includes label data) is obtained by the wireless device from a map server in the form of Data Entries ("D Entries"). Alternatively, for server-side pre-stitching, the map data is provided to a server having a pre-stitching module for performing the steps of this technique server-side. Different layers of these D Entries are used to render features of the same type or class. Thus, for example, one layer of D Entries may be for lakes, rivers and bodies of water, while another layer of D Entries may be for highways, roads and streets. This layered implementation enables context-filtering of desired or pertinent map data so that only desired or pertinent features are rendered onscreen.

In the example depicted in FIG. 6, the map is rendered from three separate D Entries (or three separate groups of D Entries from different layers). For the sake of illustration, the three D Entries (D Entry #1, D Entry #2, and D Entry #3) are rendered together to reconstitute a composite path. As each D Entry has its own (independent) path label, simply rendering the map data as a composite map would unacceptably result in redundant labelling. Thus, to avoid rendering three path labels (two of which would be redundant), the server pre-stitches the path segments (or alternatively) the map application on the client device performs the "stitching" of path segments in order to reconstruct the path, i.e. a reverse segmentation.

However, a problem arises when attempting to aesthetically label a Y-intersection, as was mentioned at the outset. For example, in a Y-intersection map 700 shown in FIG. 6, the path has three segments being reassembled from discrete sets of map data. These are (i) a first path segment (upper branch 702) of the bifurcated/split path; (ii) a second path segment (lower branch 704) of the bifurcated/split path; and (iii) a third path segment which is the "tail" or "stem" representing the merged portion 706 of the path.

As each of the three path segments has its own label, which happens to be identical to the others (because each segment actually represents a part of the same path), it is necessary to stitch the path back together again to eliminate redundant labels. However, this stitching should be done to avoid wrapping or folding the label back onto itself, as shown in FIG. 6. This "fold-back" problem occurs when the stitching algorithm in the map application stitches the first segment (upper branch 702) to the second segment (lower branch 704). This conventional stitching technique is based on a first-in-first-out (FIFO) approach, a.k.a. first-come first-served, meaning that a list of segments and their labels is compiled and searched, and the first two segments having the same label and a common endpoint are stitched together without looking beyond the first two segments to see whether there is a third segment having the same label and common endpoint). This FIFO-based stitching can result in a reconstructed path (the first path segment+the second path segment) with the third path segment remaining as its own "unstitched" segment. However, when the map application attempts to render the label at the center of the reconstructed path, the label ends up being placed where the angle is smallest and thus where the label appears worst (because it ends up being wrapped/folded back onto itself in a undesirable manner, as shown in FIG. 6). The unstitched segment is preferably not labelled but in some cases it can be labelled in addition to the labelling of the reconstructed path. In another implementation, a collision-avoidance algorithm can be used to determine which of the two labels should be rendered, i.e. the label for the reconstructed path or the label for the unstitched path. Alternatively, another technique would entail rendering only one label along the longest path in the field of view.

Figure 7:
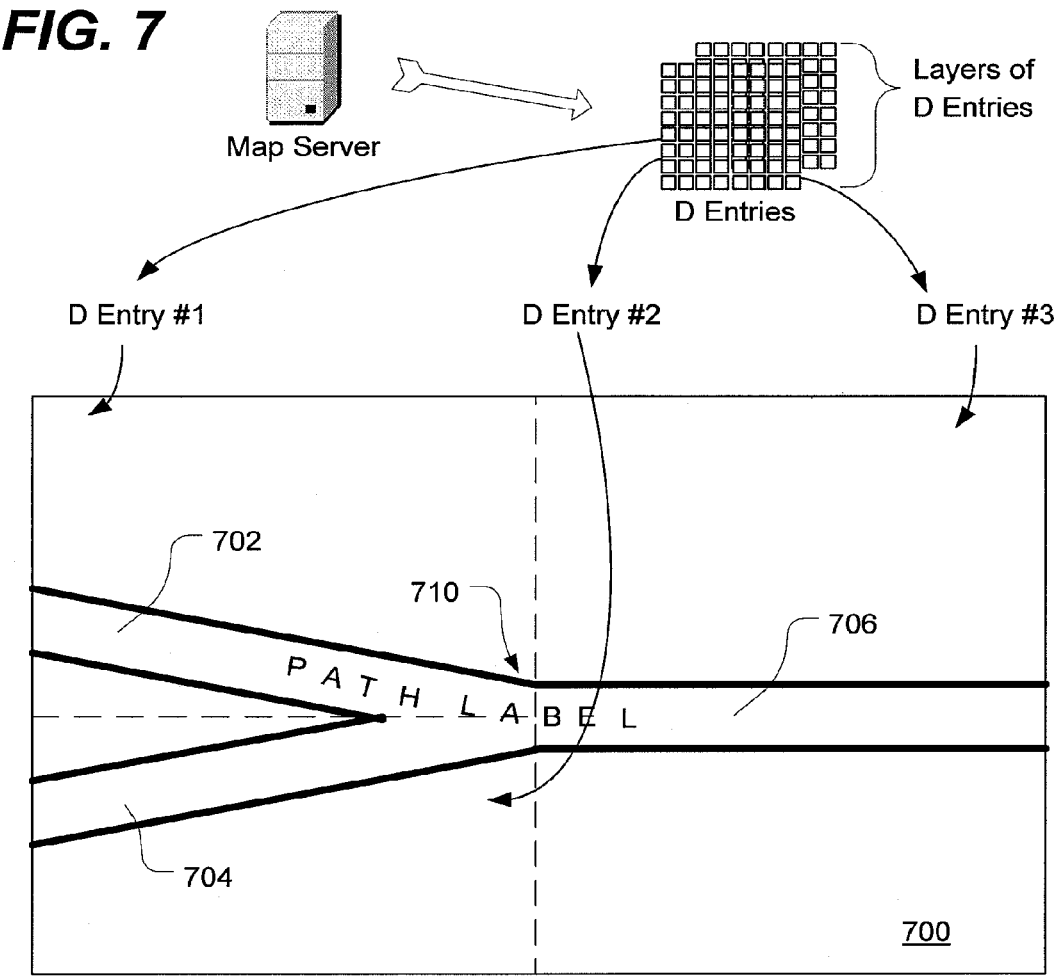
FIG. 7 schematically depicts a method of aesthetically labelling a Y-intersection by stitching together the pair of adjacent path segments subtending the largest angle.

A solution to this problem is provided by the present technology. The angles between each adjacent pair of path segments are determined and the path segments subtending the largest angle are selected for stitching together (reconstruction). This results in the straightest path being reconstructed along which the label can be rendered most aesthetically. FIG. 7 schematically depicts this method of aesthetically labelling a Y-intersection by stitching together the pair of adjacent path segments subtending the largest angle. The result is that the first path segment 702 and the third path segment 706 are stitched together, leaving the second path segment 704 on its own (un-stitched to the others). The label (e.g. "Path Label") is then rendered centrally and aesthetically along the reconstructed path formed by stitching together the first and third segments 702, 706. Stitching path segments create longer (reconstructed) paths along which it is easier to render a label without colliding with other labels. When this is done server-side, redundant labels can be eliminated to minimize the label data that must be transmitted wirelessly to the wireless handheld device.

Figure 8:
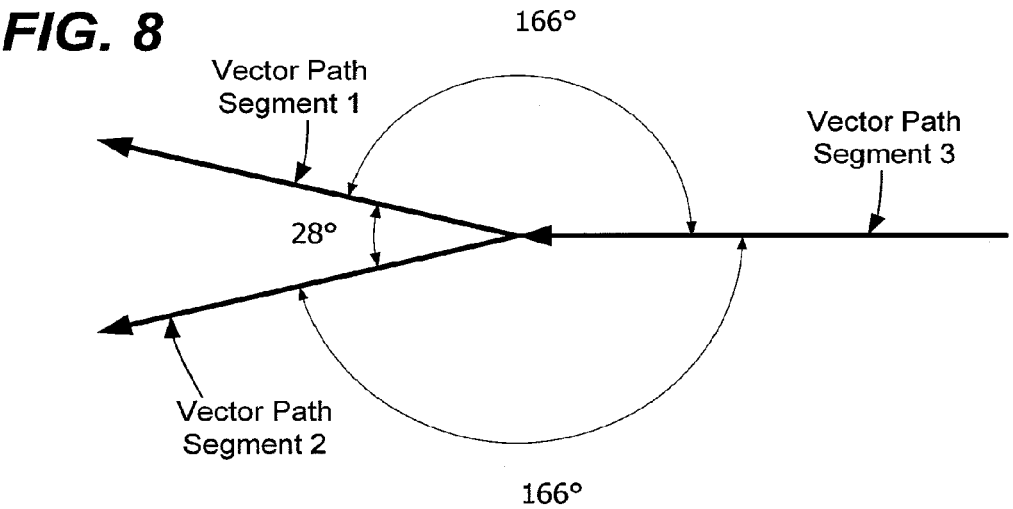
FIG. 8 schematically depicts an angle determination based on vector path segments for the segments forming the Y-intersection.

FIG. 8 schematically depicts an angle determination based on vector path segments for the segments forming the Y-intersection. In order words, since the path segments are in vector format, one very efficient way of computing the angles between adjacent pairs of segments is to compute the angles between vector path segments 1, 2 and 3, as shown in FIG. 8. The numerical values of the angles are presented merely by way of illustration. As will be readily appreciated, once two of the three angles are computed, the third can be readily deduced from the principle that the sum of the three angles must equal 360 degrees. Alternatively, all three angles can be computed directly from the vectors and then the angles can be double-checked by ensuring that their sum equals 360 degrees.

As shown in the example presented in FIG. 8, it may occur that there is no one largest angle because two of the angles are equal. To cope with this possibility, the map application on the client device (or the pre-stitching server in the case of the server-side implementation) could optionally include a "tiebreaker" algorithm for determining which of the two pairs of path segments is to be stitched. For example, the map application (or pre-stitching server) could consider proximity to other labels (for optimal readability) or alternatively the map application (or server) could stitch the pair of segments that produces the most horizontally level label. If none of these tiebreakers yield a winner, as a further tiebreaker, the map application (or server) could arbitrarily select the two path segments that results in the label being rendered along the top branch of the split. Ultimately, if there is no other basis to choose one or the other of the two pairs of path segments, the map application (or server) could randomly select one or the other.

Once the label is rendered (or at least provisionally rendered if collisions or conflicts with other labels are to be checked prior to actually rendering onscreen), then there is generally no point in rendering the label along the third segment, which has remained as an independent segment unstitched to the reconstructed path. In other words, once the map application (or pre-stitching server) renders (or provisionally renders) a label along a reconstructed path, any further or subsequent labels to be rendered are preferably discarded (i.e. not rendered) if they are identical to any previously rendered (or provisionally rendered) labels. However, another technique would be to feed both labels, i.e. the label associated with the reconstructed path and the label associated with the unstitched path into a collision-avoidance algorithm to determine which is more suitable vis-a-vis other labels of higher or equal priority. Alternatively, the choice can be made on the basis of which of the two labels is most horizontally level and/or which of the reconstructed path and unstitched path segment is longest in the field of view (which is usually, but not necessarily, the reconstructed path).

Figure 9:
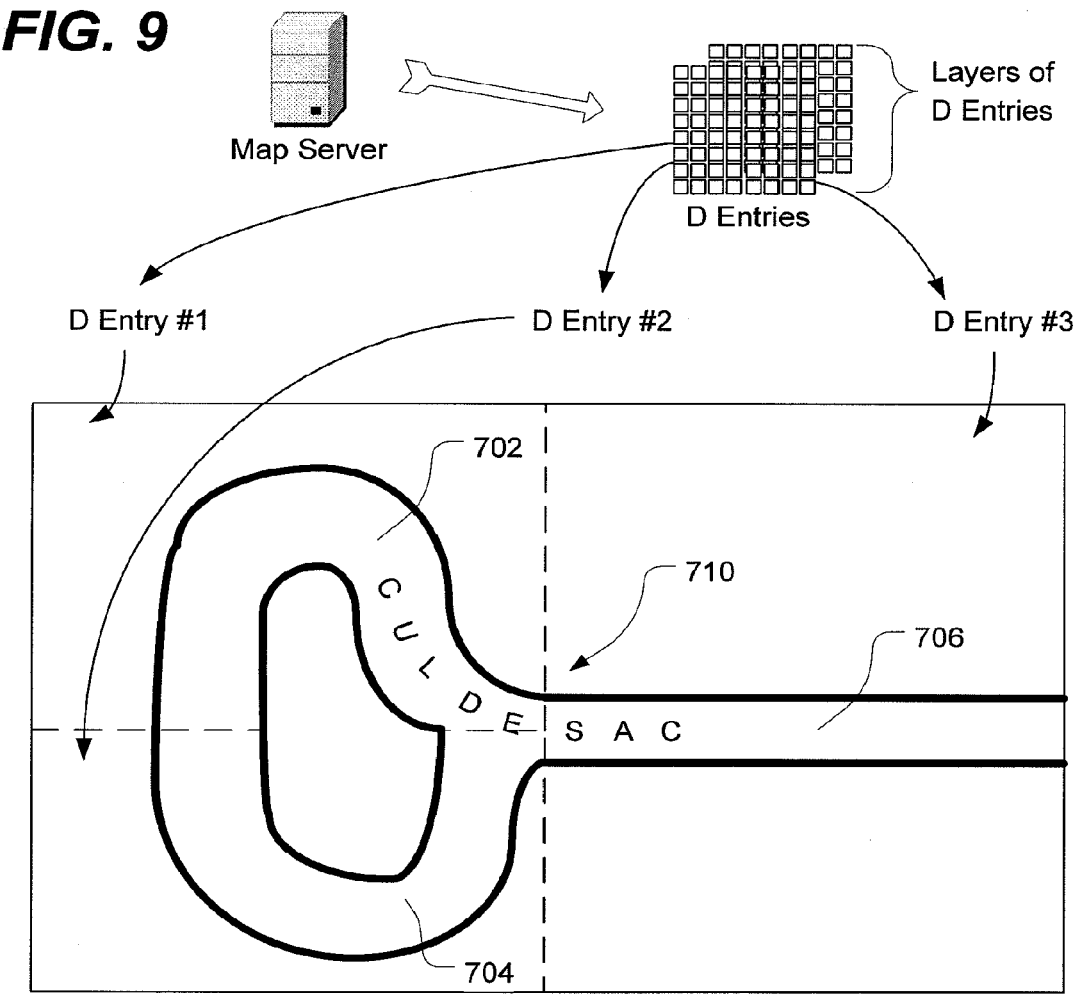
FIG. 9 schematically depicts another example involving labelling of a cul-de-sac having three path segments.
Figure 10:
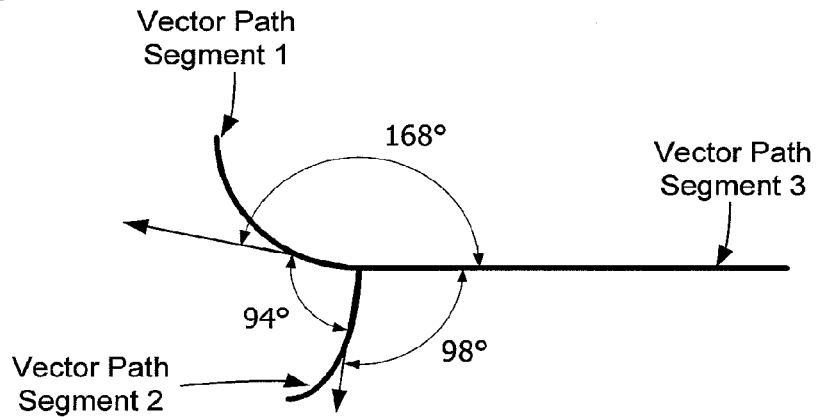
FIG. 10 shows the vector angle determination for the example of FIG. 9.

FIG. 9 schematically depicts another example involving labelling of a cul-de-sac formed from three (asymmetrical) path segments, i.e. a first path segment 702 obtained from D Entry #1, a second path segment 704 obtained from D Entry #2, and a third path segment 706 obtained from D Entry #3. The vector angle analysis is depicted in FIG. 10. Vector directions, taken at the point of convergence 710, are used to calculate the angles between each adjacent pair of path segments. Vector path segment 1 and vector path segment 3 subtend the largest angle (in this example, 168 degrees), and therefore these path segments are stitched together to provide the straightest-available reconstructed path along which the label can be aesthetically rendered. FIG. 10 shows the vector angle determination for the example of FIG. 9. Again, the vector directions are taken at the point of convergence in this example. Another technique would entail determining an average vector direction over a predetermined range, rather than looking only the vector direction at the point of convergence. In other words, this slope-averaging technique would sample the slope of the path segment at a number of points starting from the point of convergence and compare average slope (direction) with the averages obtained for the adjacent segments in order to arrive at an average angle.

Figure 11:
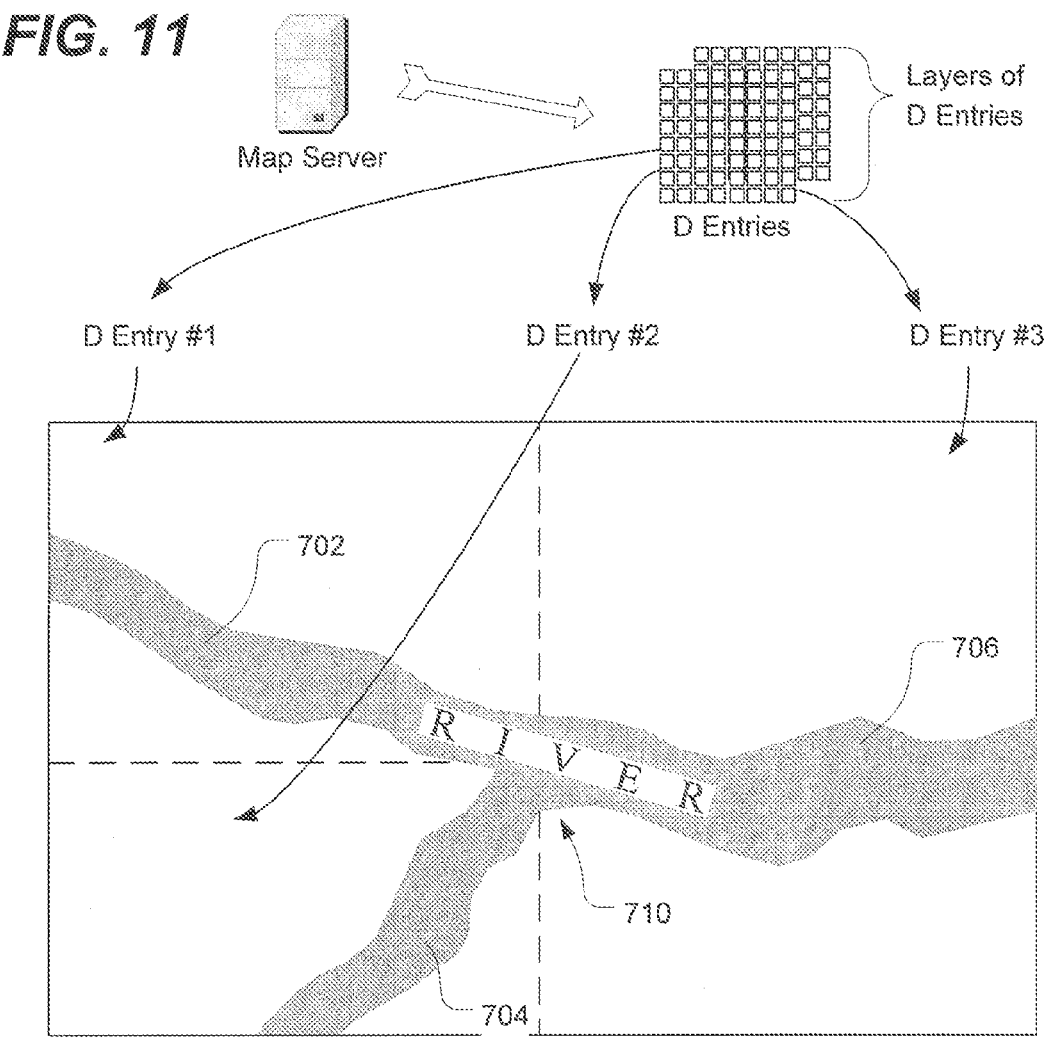
FIG. 11 schematically depicts yet another example involving labelling of a waterway having three path segments.

FIG. 11 schematically depicts yet another example involving labelling of a waterway having three path segments. In this example, it should be readily appreciated, as was mentioned earlier, that "path" is to be construed expansively to include waterways, such as the river shown in FIG. 11, where three constituent segments (each downloaded as a separate D Entry) converge in a manner that is analogous to a Y-intersection on a road.

Figure 12:
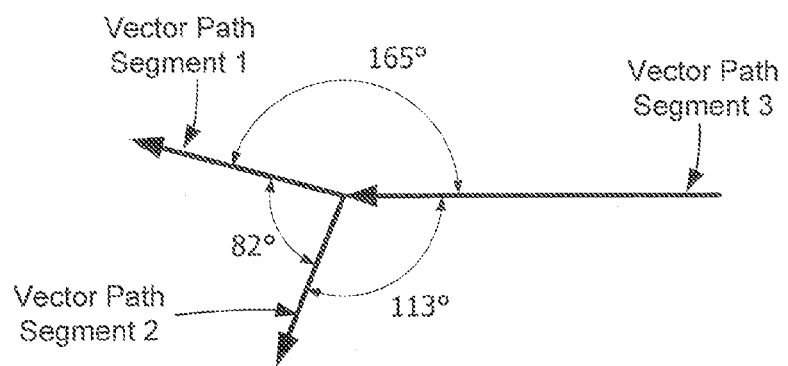
FIG. 12 shows the vector angle determination for the example of FIG. 11.

In the example presented in FIG. 11, the upper and lower branches of the river (i.e. the first segment 702 and the second segment 704) split from the merged portion (third segment 706), such as, for example, when the river bifurcates around an island, in which case the same label is to be used to label the north channel (first segment) and the south channel (second segment), not to mention the merged portion 706. As was done for the Y-intersection in FIG. 7 and the cul-de-sac in FIG. 9, the label is rendered (preferably centrally) along the reconstructed path formed by stitching together the two path segments that subtend the greatest angle. In this case, as demonstrated in FIG. 12, a vector angle determination for FIG. 11 establishes that the pair of path segments subtending the greatest angle is composed of the first path segment 702 and the third path segment 706.

The stitching in this example is preferably done server-side, although, as noted above, it can also be done client-side (i.e. directly on the device based on "raw" map data). Server-side pre-stitching is preferable, however, because this eliminates label redundancy at the server, thus reducing the amount of label data transmitted to the wireless device. Furthermore, the real-time angle calculations needed to render the labels on the map are computationally intensive, thus burdening the onboard processor on the client device.

Irrespective of whether stitching is performed server-side or client-side, the stitching (reconstruction) of path segments provides longer paths along which labels can be aesthetically placed and provides leeway to displace labels where they interfere with other labels of higher or equal priority. Once path segments are stitched, the label is preferably placed centrally vis-a-vis the path (and/or optionally relative to other path/feature characteristics such as size, thickness, or rendering attributes). The decision whether to render a label along both the reconstructed path and the unstitched path (or only one or the other) can be (optionally) determined using a collision-avoidance algorithm or with regard to which path is longest in the current field of view.

The foregoing method steps can be implemented as coded instructions in a computer program product. In other words, the computer program product is a computer-readable medium upon which software code is recorded to perform the foregoing steps when the computer program product is loaded into memory and executed on the microprocessor of the wireless communications device.

This new technology has been described in terms of specific implementations and configurations which are intended to be exemplary only. The scope of the exclusive right sought by the Applicant(s) is therefore intended to be limited solely by the appended claims.

The invention claimed is:

1. A method for a server to pre-stitch multiple converging segments of a map feature of a map requested by a wireless communications device, the method comprising:
receiving a request for map data from the wireless communications device, the map data including label data for labelling the map feature;
identifying at least three segments that converge to a common point on the map, each of the segments having an identical label;
determining an angle subtended by each pair of adjacent segments;
identifying, using at least one determined angle, which pair of adjacent segments subtends a largest angle;

generating a reconstructed map feature at the server by stitching together the pair of adjacent segments subtending the largest angle; and transmitting to the wireless communications device the map data for the reconstructed map feature.

2. The method as claimed in claim 1 wherein transmitting the map data for the reconstructed map feature further comprises transmitting a single instance of a label for the reconstructed map feature.

3. The method as claimed in claim 1 wherein determining the angle subtended by each pair of adjacent segments comprises:

determining vector directions for each of the segments at the common point where the segments converge; and computing angles between adjacent vectors.

4. The method as claimed in claim 2 further comprising: determining a center of the reconstructed map feature; and verifying whether placement of the label at the center of the reconstructed map feature interferes with any other label.

5. The method as claimed in claim 1 wherein identifying at least three segments that converge to the common point on the map comprises identifying a Y-intersection having exactly three path segments.

6. The method as claimed in claim 1 wherein determining an angle in order to identify which pair of adjacent segments subtends the largest angle comprises determining, in a case where two of the largest angles are equal, which of the adjacent segments would result in a more horizontally level label.

7. A non-transitory computer readable medium comprising code for storable in a memory of a server and executable by a processor of the server to cause the server to:

receive a request for map data from a wireless communications device, the map data including label data for labelling a map feature on a map;

identify at least three segments that converge to a common point on the map, each of the segments having an identical label;

determine an angle subtended by each pair of adjacent segments;

identify, using at least one determined angle, which pair of adjacent segments subtends a largest angle;

generate a reconstructed map feature by stitching together the pair of adjacent segments subtending the largest angle; and transmit to the wireless communications device the map data for the reconstructed map feature.

8. The computer readable medium as claimed in claim 7 wherein the code is configured to cause the server to transmit a single instance of a label for the reconstructed map feature.

9. The computer readable medium as claimed in claim 7 wherein the code to determine the angle subtended by each pair of adjacent segments further causes the server to:

determine vector directions for each of the segments at the common point where the segments converge; and compute angles between adjacent vectors.

10. The computer readable medium as claimed in claim 8 wherein the code configured to cause the server to transmit a single instance of the label further causes the server to:

determine a center of the reconstructed map feature; and verify whether placement of the label at the center of the reconstructed map feature interferes with any other label.

11. The computer readable medium as claimed in claim 8 wherein the code to identify at least three segments that converge to a common point on the map further causes the server to identify a Y-intersection having exactly three path segments.

12. The computer readable medium as claimed in claim 8 wherein the code to determine an angle in order to identify which pair of adjacent segments subtends the largest angle further causes the server to determine, in a case where two of the largest angles are equal, which of the adjacent segments would result in a more horizontally level label.

13. A server for serving map data to a client device, the server comprising:

a memory for storing map data; and a processor operatively coupled to the memory, the processor causing the server to:

in response to a request for map data, identify at least three segments that converge to a common point on a map, each of the segments having an identical label;

determine an angle subtended by each pair of adjacent segments;

identify, using at least one determined angle, which pair of adjacent segments subtends a largest angle;

generate a reconstructed map feature by stitching together the pair of adjacent segments subtending the largest angle; and transmit the map data for the reconstructed map feature.

14. The server as claimed in claim 13 wherein the processor determines the angle subtended by each pair of adjacent segments by:

determining vector directions for each of the segments at the common point where the segments converge; and computing angles between adjacent vectors.

15. The server as claimed in claim 13 wherein the processor determines a center of the reconstructed map feature and verifies whether placement of the label at the center of the reconstructed map feature interferes with any other label.

16. The server as claimed in claim 13 wherein the processor identifies at least three segments that converge to a common point on the map by identifying a Y-intersection having exactly three path segments.

17. The server as claimed in claim 13 wherein the processor further determines, in a case where two of the largest angles are equal, which of the adjacent segments would result in a more horizontally level label.

18. The server as claimed in claim 13 wherein the processor further causes the server to transmit a single instance of a label for the reconstructed map feature.

* * * * *